United States Patent [19]
Jarr et al.

[11] 3,762,550
[45] Oct. 2, 1973

[54] IRON REMOVAL FILTER SYSTEM

[75] Inventors: Klaus D. Jarr, Davenport, Iowa; John Kenneth Baker, Rock Island, Ill.; David E. Ufford, Blue Grass, Iowa; Elmer M. Deters, Muscatine, Iowa; Jimmie J. Hamann, Long Grove, Iowa

[73] Assignee: Red Jacket Manufacturing Company, Davenport, Iowa

[22] Filed: Apr. 27, 1972

[21] Appl. No.: 248,166

[52] U.S. Cl............... 210/126, 210/139, 210/190
[51] Int. Cl............................................. B01d 15/06
[58] Field of Search................. 210/97, 146, 128, 210/138–140, 190

[56] References Cited
UNITED STATES PATENTS
3,308,955   3/1967   Robarge............................ 210/139

Primary Examiner—John Adee
Attorney—Vernon J. Pillote

[57] ABSTRACT

An iron removal filter system including a filter tank containing a bed of iron removal mineral, an aspirator and a flow control valve for controlling the flow of water through the aspirator and through the filter tank during successive stages of a regeneration cycle, characterized in an improved regenerant supply system in which a solid water-soluble regenerant material is contained in a closed feeder tank and a measured quantity of water is passed from a measuring tank through the regenerant feeder tank to the aspirator during one stage of the regeneration cycle to dissolve a quantity of the regenerant and feed the same to the bed of iron removal mineral, and in which a measured quantity of water is returned to the measuring tank without passing through the feeder tank during a succeeding stage of the regeneration cycle to ready the regenerant supply system for a subsequent regeneration cycle.

12 Claims, 4 Drawing Figures

IRON REMOVAL FILTER SYSTEM

BACKGROUND OF THE INVENTION

Even very small amounts of iron and manganese are objectionable in water supplies because they form stains, affect taste, form clogging deposits, and favor the growth of iron and manganese bacteria. These metals occur in different forms in different waters and may occur as soluble bicarbonates or soluble sulfates, or in aerated water as suspended insoluble hydrated oxides. The iron and manganese, if present in a soluble ferrous state, can be removed by base exchange in an iron exchange water softener. However, if any of the iron or manganese is present in the form of insoluble hydrated oxides, the hydrated oxides will not be removed by base exchange, but will instead deposit on the bed of base exchange material and reduce its efficiency for base exchange water softening.

Iron, manganese and hydrogen sulfide can be removed from water by oxidizing the same to insoluble form, which can then be removed by filtering. This can be accomplished while the water is under pressure in an iron removal filter having a bed or iron removal mineral consisting of manganese zeolite or manganese greensand which has been treated with a permanganate solution such as potassium or sodium permanganate to coat the grains of the mineral bed with highly unstable oxides of manganese which have a high oxidizing power. The raw water, under pressure, is passed through the manganese zeolite or manganese greenshand bed and the iron or manganese is oxidized to the insoluble hydrated oxides which are removed by the filtering action of the bed. These accumulations are then removed from the bed by periodic backwash, and the bed then regenerated with potassium permanganate to restore its oxiding action. After regeneration, the bed is thoroughly rinsed and then returned to service. Such iron removal filters can be used alone, when softening of the water is not necessary or desired, or can be connected in the water supply line ahead of a base of exchange water softener, to remove the iron and manganese from the water before passage to the base exchange softener, so as to avoid contaminating the base exchange material.

Heretofore, periodic regeneration of the manganese green-sand or manganese zeolite iron filter bed has been accomplished either by opening the iron filter tank and depositing a charge of potassium permanganate crystals sufficient for one regeneration on top of the bed, followed by washing the potassium permanganate solution through the tank or, by preparing a solution of potassium permanganate in a separate vessel prior to each regeneration, and then introducing the potassium permanganate solution into the iron filter tank by an aspirator, followed by rinsing of the bed. In both of the above methods of periodically regenerating the iron filter bed, it was necessary for the operator to personally attend to each regeneration either by depositing the crystals in the iron filter bed or by mixing of the solution just prior to each regeneration.

The characteristics of the potassium permanganate regenerant used for regenerating the iron filter mineral, markedly complicates the problem of making an automatic iron filter regeneration system capable of automatically regenerating the iron filter a number of times without operator attendance. The potassium permanganate is an oxidizing agent and precipitates out in a few days if it is exposed to air. It is accordingly not practical to store a quantity of potassium permanganate regenerant solution in an open tank sufficient for a number of regenerations since the solution would lose strength in a short time and be unsatisfactory for succeeding regeneration. Moreover, the potassium permanganate is poisonous in concentrated amounts and care must be taken to prevent significant amounts of potassium permanganate from remaining in the filter bed or being introduced into the water system during the service run of the iron filter.

SUMMARY OF THE INVENTION

The present invention relates to an automatic iron removal filter regeneration system capable of effecting a number of successive regenerations of a bed of iron removal mineral without requiring the personal attention of the operator at each regeneration. The iron removal filter system includes a filter tank containing a bed of manganese greensand or manganese zeolite iron removal mineral, an aspirator, and a flow control valve means connected to the aspirator and to the filter tank to control the various flows of water to and from the filter tank and aspirator in the different stages of a regeneration cycle. The regenerant feed system includes a closed regenerant feeder tank sealed from the atmosphere to receive and store a quantity of potassium permanganate crystals sufficient for a number of regenerations of the bed of iron removal material, and a water measuring tank which is vented to the atmosphere. The feeder tank is connected by a passage to the suction inlet of the aspirator and a syphon line connects the feeder to the measuring tank to pass a measured volume of water from the measuring tank through the feeder tank and to the aspirator during the regeneration stage of the regenerating cycle. A check valve is provided in the line between the feeder tank and aspirator to prevent return flow to the feeder tank from the aspirator and a measuring tank refill passage is provided for passing water back to the measuring tank to refill the same and valve mechanism is provided for shutting off flow to the measuring tank when a selected volume of water has been re-introduced into the tank.

The closed reagent feed tank prevents exposure of the potassium permanganate in the tank to atmosphere and prevents precipitation of the potassium permanganate between regenerations. The amount of potassium permanganate introduced into the filter tank during each regeneration is controlled by the volume of water passed from the measuring tank through the feeder tank. The regenerant feeder tank is not pressurized at any stage in the regeneration cycle and is arranged so that flow from the feeder tank to the filter tank occurs only when a sub-atmospheric pressure exists at the suction inlet of the aspirator. In order to prevent return of the filter to service before the bed of iron filter material is completely rinsed of potassium permanganate solution, in the event of loss of supply pressure during the regenerant injection or rinse stages of the regeneration cycle, provision is made for interrupting operation of the regenerant control valve when the supply line pressure drops below a preselected minimum.

An important object of this invention is to provide an automatic iron removal filter regeneration system capable of effecting a number of successive regenerations of the bed of iron removal mineral without requiring operator attendance at each regeneration.

Another object of this invention is to provide an automatic iron removal filter regeneration system which will reliably prevent introduction of potassium permanganate solution from the regenerant feeder tank into the water system during the service stage of the regeneration cycle.

These, together with other objects and advantages of this invention will be more readily understood from the following detailed description when taken in connection with the accompanying drawings wherein.

Figure 1:
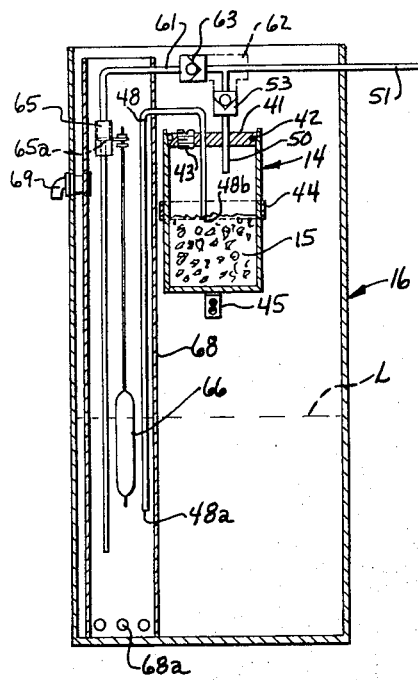
FIG. 1 is a diagrammatic view showing an iron removal filter regeneration system embodying the present invention in its service position.
Figure 1:
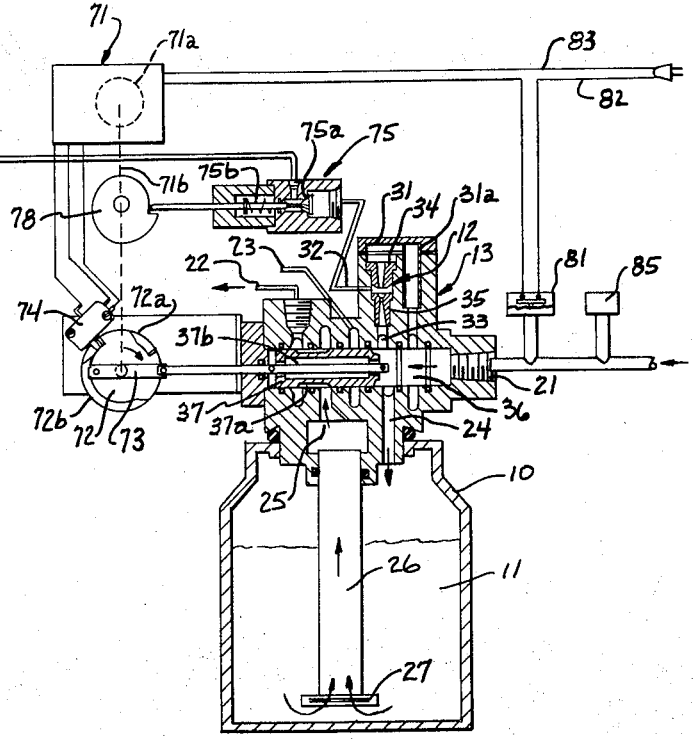

Referring now more specifically to the accompanying drawings, the iron removal filter system includes a filter tank 10 containing a bed 11 of iron removal mineral consisting of manganese greensand or manganese zeolite; an aspirator 12; a regenerant flow control valve 13 for controlling the flow of fluid to and from the treatment tank and aspirator in the various stages of a regeneration cycle; a closed regenerant feeder tank 14 for receiving a charge 15 of solid water soluble iron filter regenerant material consisting of potassium or sodium permanganate; and a water measuring tank 16 for measuring a quantity of water for use in each regeneration. The regenerant control valve 13 can be of any suitable type adapted for controlling the various flows of fluid to and from the treatment tank 10 and aspirator 12 and is preferably of the type having at least three positions including a down-flow service position, up-flow backwash position, and down-flow regenerant feed and rinse position. In the embodiment illustrated, the valve 13 is of the four position spool valve type more fully disclosed in the U. S. Pat. to Fleckenstein et al. No. 3,349,915, to which reference is made for a more detailed description. In general, the flow control valve 13 includes a raw water inlet 21, a service outlet 22, a drain outlet 23 and upper and lower tank connecting passages 24 and 25. The valve 13 is conveniently mounted on the top of the filter tank 10 with the upper tank connecting passage 24 communicating with the upper end of the tank and with the lower tank connecting passage 25 connecting through a conduit 26 and lower header 27 with the lower portion of the iron filter tank. The aspirator 12 has an aspirator inlet 31, a suction inlet 32 and an aspirator outlet 33, with an orifice member 34 disposed between the aspirator inlet and the suction inlet and arranged to direct the jet water into a throat member 35 located between the suction inlet 32 and the aspirator outlet, to produce a subatmospheric pressure at the suction inlet when water is passed through the aspirator. In the spool type regenerant control valve illustrated, the raw water inlet 21 communicates with a valve chamber at one end and the aspirator inlet 31 communicates through a screened passage 31a with the valve chamber intermediate its ends. The aspirator outlet 33 communicates with the valve chamber at a location spaced therealong from the aspirator inlet passage and the upper and lower tank connecting passages 24 and 25, the service passage 22, and drain passage 23 also communicate with the valve chamber 36 at spaced points therealong. A valve member 37 is mounted for movement along the valve chamber between different positions including a service position, a backwash position, and a regenerant feed position. As shown in FIG. 1, the valve member 37 in its first or service position passes fluid from the raw water inlet 21 to the upper tank connecting passage 24 for flow down through the bed 11 of iron removal mineral and out through the lower distributor 27 and lower tank connecting passage 25 through a peripheral passage 37a in the valve member 37 and out through the service outlet 22. In the service position, the valve member 37 also applies fluid pressure from the raw water inlet 21 to both the aspirator inlet 31 and the aspirator outlet 33 so that the pressures at the orifice 34 and throat 35 are equalized and apply fluid under pressure to the suction inlet 32 of the aspirator. The valve member 37 is movable to a second or backwash position shown in FIG. 2 in which water from the raw water inlet 21 is supplied through an axial passage 37b in the valve member 37 to the lower tank connecting passage 25 for flow through the lower distributor 27 and upwardly through the mineral bed 11 and out through the upper tank connecting passage 24 and through valve passage 37a to the drain passage 23, to thereby backwash the bed of iron removal mineral. The valve is also conveniently arranged to provide a by-pass of raw water from the inlet 21 through axial passage 37b in the valve member 37 to the service outlet during backwash. The valve 13 shown herein is of the type which effects downflow regeneration and accordingly, the valve member is arranged to shut-off flow to the aspirator inlet 31, when the valve member is in its backwash position, to thereby prevent producing a subatmospheric pressure at the suction inlet 32 during backwash.

Figure 3:
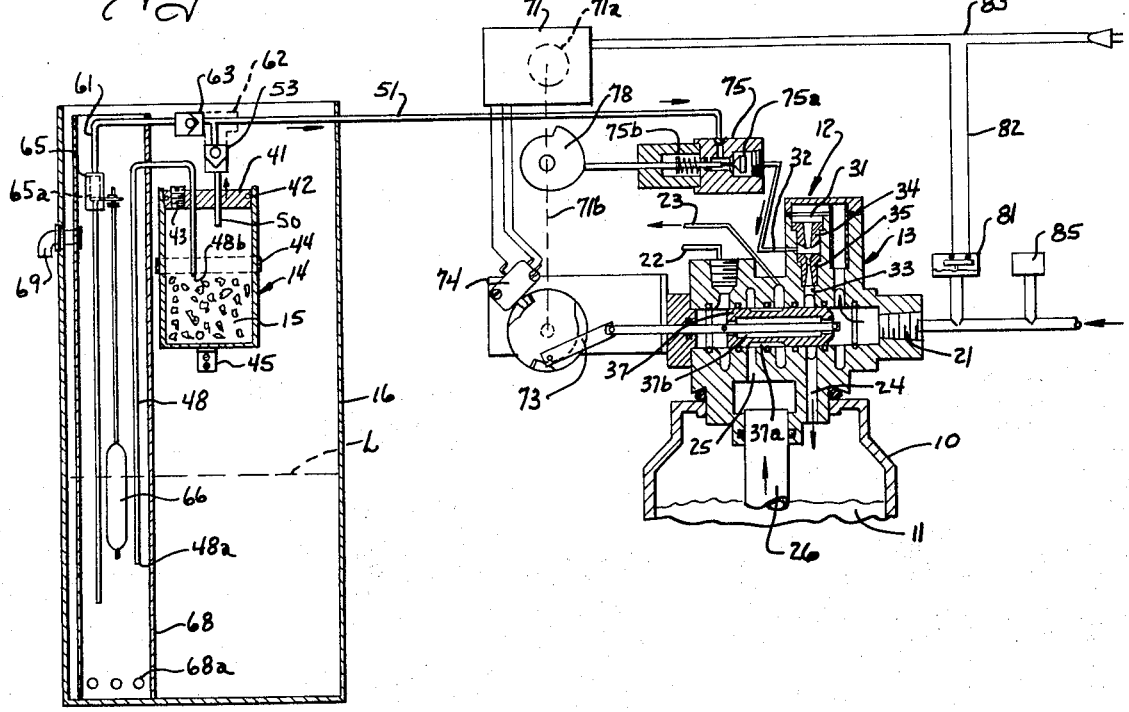
FIG. 3 is a diagrammatic view showing the iron removal filter system of the present invention in its regenerating position.
Figure 4:
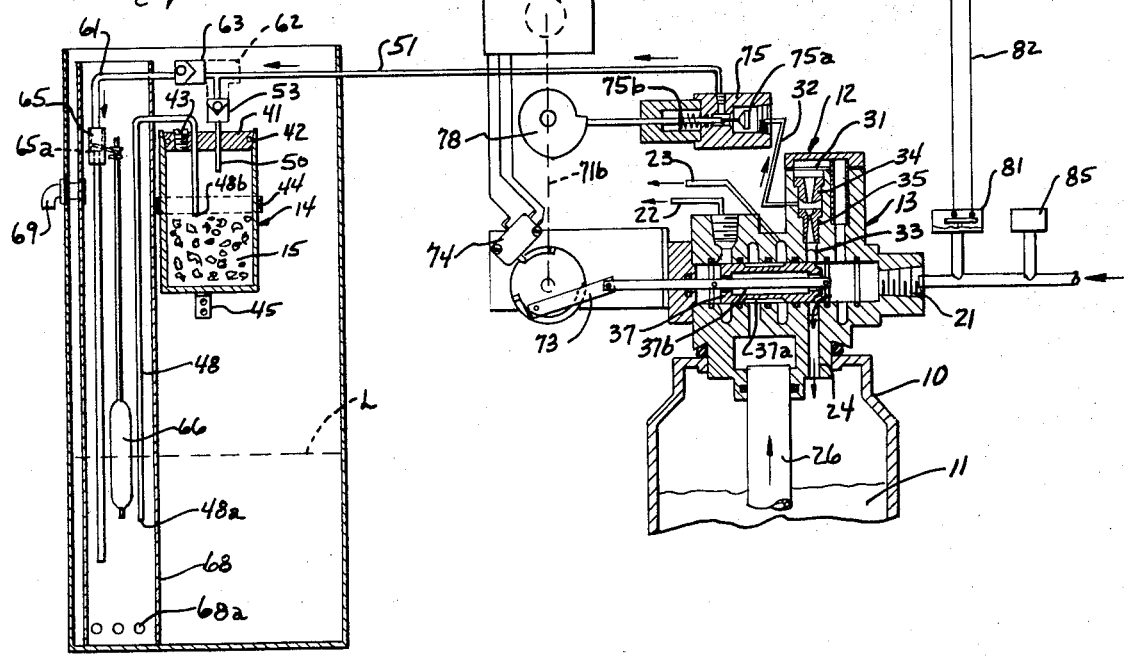
FIG. 4 is a diagrammatic view showing the iron removal filter system of the present invention in the measuring tank refill position.

Valve member 37 is movable to a third or regenerant feed position shown in FIG. 3 in which water from the raw water inlet is supplied to the aspirator inlet 31 and the aspirator outlet 33 is connected to the upper tank connecting passage 24. Water from the raw water inlet 21 thus flows through the aspirator inlet 31, through the orifice 34 and throat 35 to the upper end of the filter tank 10 to produce a sub-atmospheric pressure at the suction inlet 32 of the aspirator. Water from the lower end of the treatment tank passes out through the distributor 27 and lower tank connecting passage 25, valve passage 37b to the drain outlet 23. As previously described, the specific valve illustrated herein is of the four-position type and is movable to a fourth position shown in FIG. 4 to provide a timer controlled refill of the measuring tank. As more fully described in the aforementioned U.S. Pat. No. 3,349,915, the valve in its refill position is also advantageously arranged to provide a rapid rinse of the bed of mineral and, as shown in FIG. 4, is arranged to pass water from inlet 21 to the top tank connecting passage 24 and to pass fluid from the bottom tank connecting passage through valve passage 37a to the drain outlet to provide a downflow rapid rinse of the bed of mineral. In the refill position shown in FIG. 4, water under pressure from the inlet 21 is applied to both the aspirator inlet 31 and aspirator outlet 33 to thereby supply fluid under above-atmospheric pressure to the suction inlet 32 during the refill stage of the regeneration cycle.

The regenerant feeder tank 14 is a closed tank conveniently formed of a noncorrodible material such as plastic and dimensioned to receive a charge of potassium permanganate crystals sufficient for a number of regenerations of the bed of iron removal mineral. The tank 14 has a cover 41 sealed to the side walls of the tank as by an O-ring 42 and a removable cap 43 to enable refilling of the regenerant feeder tank with additional potassium permanganate crystals, after a number of regenerations. The feeder tank 14 is conveniently located within the measuring tank 16 above the upper liquid level therein and, as shown, is supported by brackets 44 and 45 on the feeder tank.

A syphon line 48 is provided for passing water from the measuring tank 16 to the feeder tank 14 and has its inlet 48a arranged to communicate with the measuring tank at a preselected level therein and its outlet 48b communicating with the feeder tank. The syphon line 48 conveniently extends through an opening in the top 41 of the feeder tank, in sealed relation thereto, and preferably has its outlet end 48b located approximately centrally of the feeder tank at a location above the bottom thereof to distribute the water from the syphon line generally uniformly in the feeder tank. The feeder tank is also connected through a regenerant feed passage including conduits 50 and 51 to the syphon inlet 32 of the ejector. As shown, the conduit 50 extends through an opening in the cover 41 of the feeder tank in sealed relation thereto and communicates with the feeder tank adjacent the upper end thereof and preferably above the level of the syphon outlet 48b. A check valve 53 is provided in the conduit 50 and is arranged to open for flow from the feeder tank to the syphon inlet of the aspirator, and to close to prevent return flow from the aspirator back to the feeder tank. Thus, when the regenerant control valve 13 is moved to its regenerant feed position shown in FIG. 3, the valve passes water to the aspirator inlet 31 for flow through the aspirator outlet to the top of the treatment tank, to produce a subatmospheric pressure at the suction inlet 32. The aspirator initially draws air from the feeder tank until the pressure in the feeder tank is reduced below atmospheric pressure sufficient to start the syphon and cause water to flow from the measuring tank 16 through the syphon line 48 and into the feeder tank and from the feeder tank through conduits 50, 51 to the aspirator. As the water from the measuring tank flows through the feeder tank, it dissolves a quantity of the potassium permanganate crystals in the feeder tank correlative with the volume of water passed through the feeder tank and this potassium permanganate solution is fed through the conduits 50, 51 to the aspirator for admixture with the water flowing through the aspirator to the top of the treatment tank. The quantity of water which is passed from the measuring tank 16 through the feeder tank 14 is selected in accordance with the volume of the iron removal mineral bed 11 to provide sufficient potassium permanganate to regenerate or restore the oxidizing action of the manganese zeolite or manganese greensand mineral bed. Water will continue to be fed from the measuring tank through the feeder tank until the water level drops below the syphon inlet 48a. Thereafter air is passed through the syphon line 48 and through the feeder tank and conduit 51 to the aspirator so that the continued flow of water through the aspirator produces a slow rinsing of the potassium permanganate from the bed or iron removal mineral 11.

Figure 2:
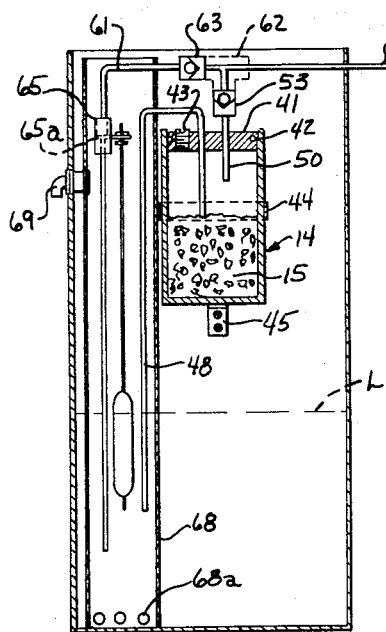
FIG. 2 is a diagrammatic view showing an iron removal filter system of the present invention in its backwash position.
Figure 2:
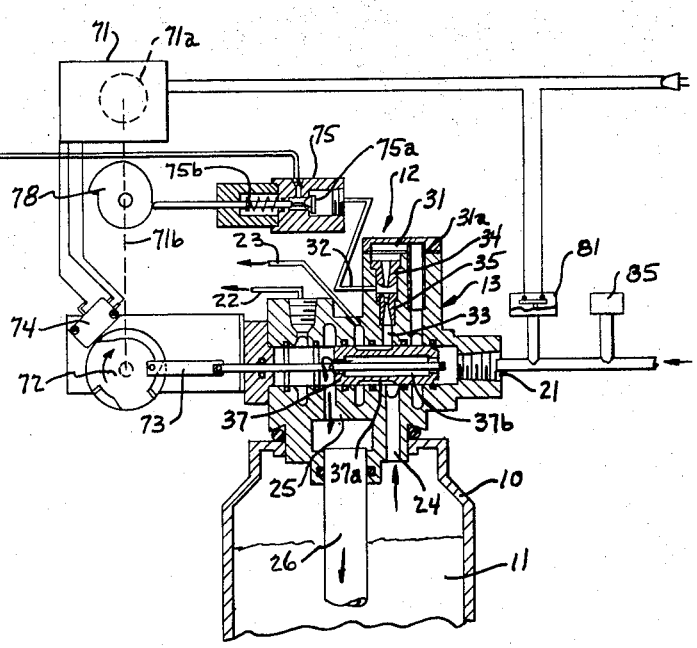

A measured quantity of water is thereafter reintroduced into the measuring tank 16 preparatory for a succeeding regeneration. Refill water is supplied to the measuring tank through a refill line 61 conveniently connected as by a T-fitting 62 to the conduit 51 leading to the suction inlet of the aspirator. A check valve 63 is provided in the refill line 61 and is arranged to open for flow to the measuring tank, and to close to prevent return flow through the refill line 61. A valve means is provided for controlling the flow through the refill line 61 to shut-off flow through that line when a selected volume of liquid has been introduced into the measuring tank, and for this purpose a float valve 65 is provided in the line 61. The float valve 65 has a valve member 65a movable under the control of a float 66 from an open position as shown in FIG. 4, to a closed position as shown in FIGS. 1–3, when the water level at the measuring tank rises to a preselected level $L$ above the syphon inlet 48a. The float valve 66 and the inlet end 48a of the syphon line 48 are preferably located within a tubular well 68 in th measuring tank, suitable apertures 68a being provided adjacent the lower end of the well to afford free communication between the well and the measuring tank. An overflow passage 69 is also preferably provided in the measuring tank to pass water from the measuring tank to drain in the event the float valve 65 malfunctions and fails to shut-off flow to the measuring tank.

The regenerant control valve 13 is moved through the successive stages of a regeneration cycle by an electro-responsive timer mechanism 71. The timer mechanism can be of any conventional construction capable of operating the valve from its service to its backwash and regenerant feed positions at selected time intervals during a regeneration cycle. The timer mechanism diagrammatically shown in the drawings is of the type disclosed in the aforementioned U.S. Pat. No. 3,349,915 and includes a drive motor 71a which is drivingly connected as through a shaft 71b to a crank wheel 72. The crank wheel 72 is in turn connected through a link 73 to the valve member 37 to move the valve member from its service position shown in FIG. 1 to its backwash regenerant feed, and refill positions shown in FIGS. 2, 3 and 4, as the crank rotates through one revolution. A position responsive switch 74 operated by cams on the crank wheel 72, sense the position of the valve member and is operatively connected to the timer 71 so as to effect movement of the valve member between its different positions at the selected time intervals.

Potassium permanganate is poisonous in concentrated amounts and, in order to further reduce the possibility of feeding potassium permanganate into the water supply, a regenerant control valve 75 of the type also disclosed in the aforementioned U.S. Pat. No. 3,349,915, is advantageously provided in the aspirator line 51. As more fully disclosed in the aforementioned patent, the aspirator valve 75 includes a movable valve member 75a which is normally urged to its closed position by a spring 75b to block flow through the aspirator line. The valve member 75a is operated to its open position during the regenerant feed stage and the refill stage of the regeneration cycle by a cam 78 operated in timed relation with the regenerant control valve.

Valve 75a is closed in the service and backwash stages of the regeneration cycle shown in FIGS. 1 and 2 and is opened only during the regenerant feed and refill stages shown in FIGS. 3 and 4. The regenerant control valve 75 will therefore function to isolate the regenerant feed tank from the water supply system during the normal service stage and also during the backwash stage of the regeneration cycle.

Since the potassium permanganate is poisonous in concentrated amounts, a serious condition could occur if there was a loss of pressure in the raw water inlet during the regeneration cycle such as to prevent adequate rinsing of the potassium permanganate from the iron removal mineral. In order to prevent the electro-responsive timer mechanism from continuing operation of the flow control valve through the remainder of its regeneration cycle, in the event of loss of pressure at the raw water inlet during the regeneration cycle, a pressure switch 81 is provided in the raw water inlet line and connected to the power conductors 82, 83 leading to the timer so as to shut-off the timer mechanism to stop operation of the valve in the event of low pressure condition. Thus, pressure switch 81 opens the circuit to a timer mechanism when a low pressure condition is sensed to stop the timer mechanism. When pressure is thereafter restored, switch 81 closes and re-energizes the timer to complete the regeneration cycle.

As an additional safety device, a vacuum breaker 85 is advantageously provided in the raw water inlet line to prevent back syphoning in the event the supply pressure fails at any time during service or regeneration.

OPERATION

From the foregoing it is thought that the construction and operation of the iron removal filter system will be readily understood. A quantity of potassium permanganate crystals sufficient for a number of regenerations is introduced into the feeder tank 14. For example, 3½ to 4 ounces of potassium permanganate crystals will be sufficient to regenerate a 1 cubic foot bed of manganese greensand iron removal mineral, when supplied to the bed in a dilute solution. Thus, a two-pound charge of potassium permanganate in the feeder will be sufficient for about six regenerations of a 1 cubic foot bed of manganese greensand. The volume of water supplied to the feeder tank, corresponding to the volume in the measuring tank between the upper liquid level $L$ controlled by the float and the lower liquid level determined by the lower end of the syphon inlet 48a, is selected so as to dissolve a quantity of the potassium permanganate in the feeder somewhat in excess of that required for regeneration of the bed. For example, for a 1 cubic foot mineral bed, slightly more than 1 gallon of water is passed from the measuring tank through the feeder tank to dissolve the potassium permanganate. The potassium permanganate solution from the feeder tank is mixed with the water flowing through the aspirator and the diluted potassium permanganate solution is passed downwardly through the mineral bed until the liquid level in the tank drops below the syphon inlet.

The timer mechanism 71 is advantageously of the adjustable type which can be preset to control the interval between successive regenerations, as determined by the average amount of iron, manganese and hydrogen sulfide in the water as well as the average water usage. The timer mechanism is also adjustable to control the duration of the different phases or stages of the regeneration cycle and may, for example, be set to provide a 12-minute backwash phase, a 20-minute regenerant and slow rinse phase, an a 20-minute rapid rinse and tank refill phase. At the start of the regeneration cycle, the timer mechanism operates the valve from its service position shown in FIG. 1 to its backwash position shown in FIG. 2 to provide up-flow backwashing of the bed for a time interval sufficient to remove the foreign material from the mineral bed. The timer mechanism then moves the valve 13 to its regenerant feed position shown in FIG. 3 to pass water through the aspirator 12 to the treatment tank and draw a measured quantity of liquid from the measuring tank through the feeder tank and through feeder conduits 50, 51 to the aspirator. The water flowing through the feeder tank 14 dissolves a quantity of the potassium permanganate crystals correlative with the volume of water passed through the feeder tank and the permanganate solution is passed through conduits 50, 51 to the aspirator for mixture with the water flowing to the filter tank. After the selected volume of water has been drawn from the measuring tank and the liquid level drops below the syphon inlet, the flow of water from the measuring tank to the feeder tank is interrupted. However, water continues to flow through the aspirator to the treatment tank to provide a slow rinse of the iron filter bed. At the completion of the slow rinse phase of the regeneration cycle, the timer operates the valve to its refill position shown in FIG. 4. In this position, the syphon inlet 32 of the aspirator is under pressure from raw water inlet 21 and water flows through aspirator passage 51, check valve 63, refill passage 61 and float valve 65 to the measuring tank to refill the measuring tank. When the water level reaches its preselected upper level $L$, the float 66 operates valve 65 to shut-off flow to the measuring tank. At the end of the refill and rapid rinse stage, the timer 71 operates the flow control valve 13 back to its service positon shown in FIG. 1 for the service phase of the cycle.

While the invention has been herein illustrated and described in connection with a specific flow control valve, it will be apparent to those skilled in the art that other flow control valves can be utilized. For example, while the flow control valve herein disclosed is of the four-position type having a separate refill and rapid rinse stage, the rapid rinse stage can be omitted provided the slow rinse stage is adjusted to provide adequate rinsing of the mineral bed. Moreover, refill of the measuring tank can be effected during other stages of the cycle, for example during the service stage.

We claim:

1. In an iron removal filter regenerating system for treating iron bearing water including a filter tank containing a bed of iron removal mineral, raw water inlet conduit means, a treated water outlet conduit means, drain conduit means, an aspirator having an aspirator inlet, a suction inlet, and an aspirator outlet, and flow control valve means for controlling flow through said conduit means to and from the treatment tank and aspirator operative in one position thereof to pass water to the aspirator inlet for flow through the aspirator outlet to the filter tank to produce a sub-atmospheric pressure at the suction inlet of the aspirator and operative in at least one other position thereof to pass water under pressure to said suction inlet of the aspirator, the improvement comprising an iron filter regenerant supply system including a measuring tank vented to atmosphere, a closed regenerant feeder tank sealed from the surrounding atmosphere and dimensioned to receive a charge of solid water soluble iron filter regenerating material in excess of that required for a single regeneration of the bed of iron filter mineral, a first passage means connecting the suction inlet of the aspirator to said measuring tank and having a first check valve means therein operative to open for flow therethrough to the measuring tank from the suction inlet of the aspirator when water under pressure is supplied to the suction inlet and to close to prevent return flow from the measuring tank, means controlling flow of water through said first passage means into said measuring tank and operative to shut off flow through said first passage means when a preselected volume of water has been introduced into the measuring tank, a second passage means communicating the suction inlet of said aspirator with said closed feeder tank and having a second check valve means therein operative to open for flow from the feeder tank to the suction inlet of the aspirator and to close to prevent return flow to the feeder tank and a third passage means communicating said measuring tank with said feeder tank operative to pass said preselected volume of water from the measuring tank to the feeder tank for flow through the latter and through said second passage means to the suction inlet of the aspirator when said subatmospheric pressure exists at the suction inlet for admixture with the water flowing through the aspirator to the filter tank.

2. The combination of claim 1 wherein said third passage means comprises a valveless syphon line having a syphon inlet communicating with the measuring tank at a preselected lower level therein and a syphon outlet communicating with said feeder tank.

3. The combination of claim 2 wherein said means for controlling the flow of water into said measuring tank includes liquid level responsive valve means in said first passage means operative to shut off flow of water into the measuring tank when the water reaches a preselected upper liquid level above the syphon inlet.

4. The combination of claim 2 wherein said reagent feeder tank is positioned at a level above the water in the measuring tank.

5. The combination of claim 1 wherein said means controlling the flow of water into said measuring tank includes liquid level responsive valve means in said first passage means operative to shut off flow of water into the measuring tank when the water reaches a preselected upper level.

6. The combination of claim 1 including electroresponsive means for operating said valve means through a regeneration cycle, and means responsive to the water pressure at said raw water inlet conduit means for interrupting energization of said electroresponsive means when the pressure at said raw water inlet conduit means falls below a preselected minimum pressure.

7. In an iron removal filter regenerating system including a filter tank containing a bed of iron removal mineral, an aspirator having a suction inlet, and regeneration control valve means connected to said aspirator and to said tank and having a raw water inlet, a treated water outlet, and a drain outlet and operable through successive stages of a regeneration cycle including a first stage in which water from the raw water inlet is passed downwardly through the mineral bed to the service outlet; a second stage in which water from the raw water inlet is passed upwardly through the mineral bed to the drain outlet, and a third stage in which water from the raw water inlet is passed through the aspirator to the filter tank for flow through the mineral bed to the drain outlet, the aspirator being operable in said third stage to produce a sub-atmospheric pressure at the suction inlet and the valve means being operable in at least one other stage to supply water under pressure to the suction inlet of the aspirator, the improvement comprising, an iron filter regenerant supply system including a measuring tank vented to atmosphere, a closed regenerant feeder tank sealed from the surrounding atmosphere and dimensioned to receive a charge of solid water soluble iron filter regenerating material sufficient for at least several regenerations of the bed of iron filter mineral, a first passage means connecting the suction inlet of the aspirator to said measuring tank and having a first check valve means therein operative to open for flow to the measuring tank from the suction inlet of the aspirator when water under pressure is supplied to the suction inlet and to close to prevent return flow from the measuring tank, means controlling flow of water through said first passage means into said measuring tank and operative to shut off flow through said first passage means when a preselected volume of water has been introduced into the measuring tank, a second passage means communicating the suction inlet of the aspirator with said closed feeder tank and having a second check valve means therein operative to open for flow from the feeder tank to the suction inlet of the aspirator and to close to prevent return flow to the feeder tank, a third passage means communicating said measuring tank with said feeder tank operative to pass said preselected volume of water from the measuring tank to the feeder tank for flow through the latter and through said second passage means to the suction inlet of the aspirator when said valve means is in said third position for admixture with the water flowing through the aspirator to the filter tank.

8. The combination of claim 7 wherein said third passage means comprises a valveless syphon line having a syphon inlet communicating with said measuring tank at a preselected lower level therein and a syphon outlet communicating with said feeder tank.

9. The combination of claim 8 wherein said means controlling flow of water into the measuring tank includes liquid level responsive valve means in said first passage means operative to shut off flow of water into the measuring tank when the water reaches a preselected upper liquid level above the syphon inlet.

10. The combination of claim 7 including electroresponsive means for operating said valve means through said regeneration cycle, and means responsive to the water pressure at said raw water inlet conduit means for interrupting energization of said electro-responsive means and prevent return of the valve means to its service stage when the pressure at said raw water inlet falls below a preselected minimum pressure.

11. The combination of claim 7 including electrically operated timer means for operating said valve means through said regeneration cycle, auxiliary valve means controlling flow between said suction inlet of the aspirator and said first and second passage means, means controlled by said timer means for opening said auxiliary valve during said third stage of said regeneration cycle and for a preselected time interval during one other stage of said regeneration cycle and for closing said auxiliary valve during the remainder of said regeneration cycle.

12. An iron removal filter regeneration system including a filter tank containing a bed of iron removal mineral, a closed regenerant feeder tank sealed from the surrounding atmosphere and dimensioned to receive a charge of solid water soluble iron filter regenerating material sufficient for at least several regenerations of the bed or iron filter mineral, a measuring tank vented to atmosphere, an aspirator having a suction inlet, regeneration control valve means connected to said aspirator and to said filter tank and having a raw water inlet, a treated water outlet and a drain outlet, electro-responsive timer means for operating said valve means through a regeneration cycle including a service position in which water from the raw water inlet is passed downwardly through the mineral bed to the service outlet, a backwash portion in which water from the raw water inlet is passed upwardly through the mineral bed to the drain outlet; and a regenerant position in which water from the raw water inlet is passed through the aspirator to the filter tank for flow through the mineral bed to the drain outlet, the aspirator being operable when the valve means is in said regenerant position to produce a sub-atmospheric pressure at the suction inlet of the aspirator, a first passage means communicating said suction inlet of the aspirator to said feeder tank and having check valve means therein operable to open for flow from the feeder tank to the suction inlet of the aspirator, a second syphon passage means having a syphon inlet communicating with said measuring tank at a preselected level therein and a syphon outlet communi-cating with said feeder tank to pass water from the measuring tank through the feeder tank to the aspirator when said valve means is in said regenerant position, and a third passage means for supplying water to said measuring tank when said valve means is in a position other than said regenerant position, valve means controlling flow through said third passage means operative to shut off flow to the measuring tank when a measured volume of water has been introduced into the measuring tank, and means responsive to water pressure at said raw water inlet for interrupting energization of said electro-responsive means to prevent return of the valve means to its service position when the pressure at the raw water inlet falls below a preselected minimum pressure.

* * * * *

PO-1050
(5/69)

UNITED STATES PATENT OFFICE
CERTIFICATE OF CORRECTION

Patent No. 3,762,550   Dated October 2, 1973

Inventor(s) Klaus D. Jarr et al.

It is certified that error appears in the above-identified patent and that said Letters Patent are hereby corrected as shown below:

Column 11, line 9, "or" should be -- of --;

Column 11, line 18, "portion" should be -- position --.

Signed and sealed this 26th day of February 1974.

(SEAL)
Attest:

EDWARD M. FLETCHER, JR.
Attesting Officer

C. MARSHALL DANN
Commissioner of Patents